Feb. 26, 1963 B. C. DE LOACH, JR 3,079,569

LOW NOISE AMPLIFIER INPUT NETWORK

Filed Nov. 30, 1961 3 Sheets-Sheet 1

INVENTOR
B. C. DE LOACH, JR.
BY
Sylvan Sherman
ATTORNEY

Feb. 26, 1963 B. C. DE LOACH, JR 3,079,569

LOW NOISE AMPLIFIER INPUT NETWORK

Filed Nov. 30, 1961 3 Sheets-Sheet 2

INVENTOR
B. C. DE LOACH, JR.
BY
Sylvan Sherman
ATTORNEY

LOW NOISE AMPLIFIER INPUT NETWORK

Filed Nov. 30, 1961 3 Sheets-Sheet 3

INVENTOR
B. C. DE LOACH, JR.
BY
Sylvan Sherman
ATTORNEY

United States Patent Office 3,079,569
Patented Feb. 26, 1963

3,079,569

LOW NOISE AMPLIFIER INPUT NETWORK

Bernard C. De Loach, Jr., Little Silver, N.J., assignor to Bell Telephone Laboratories, Incorporated, New York, N.Y., a corporation of New York Filed Nov. 30, 1961, Ser. No. 155,917
12 Claims. (Cl. 330—185)

This invention relates to electromagnetic wave transmission systems and, in particular, to low noise amplifiers for use in such systems.

When a radio is adjusted for high sensitivity, there is always a background of noise which places a lower limit upon the level of signal that can be detected. A portion of this noise arises from thermal agitation in the input circuit of the receiver and, in a properly designed receiver, this thermal agitation constitutes the primary noise source in the receiver. The extent to which this is so can be readily demonstrated by short circuiting the input circuit and noting the extent of the noise reduction realized.

Typically, in a radio receiver, the relative intensity of the signal and the noise applied to the first amplifier is established by the antenna system. Currently, the use of highly sophisticated antennas, such as the horn-reflector, has greatly reduced the noise introduced by the antenna and a substantial improvement in the available signal-to-noise ratio has been realized. As a result of this improvement, however, the noise contribution of the antenna load, which is generally the input conductance of the first amplifier in the receiver, has become a substantial factor in the noise performance of the receiver.

It is, therefore, the broad object of this invention to amplify the signal derived from a signal source with minimum degradation in the signal-to-noise ratio established by the signal source.

It is another object of the invention to minimize the noise contribution of the input conductance associated with an amplifier.

As indicated above, short circuiting the input circuit of a receiver tends to reduce the level of noise in the receiver output. In general, however, this procedure is not a suitable solution to the noise problem since, in the absence of special precautions, short circuiting the input circuit for noise also short circuits the signal.

It is, accordingly, a more specific object of this invention to selectively short circuit the input conductance of an amplifier for noise without short circuiting the signal.

With the advent of parametric amplifiers and Esaki diodes, means for obtaining a low noise negative conductance are now available and, hence, practical means are now at hand for minimizing the contribution of noise generated in a conductive load. In accordance with the invention the noise generated in a conductive load is substantially eliminated by inserting a low noise negative conductance between the signal source and its load. By suitably relating the amplitude of the negative conductance and the conductance of the signal source and by adjusting the electrical spacing between the negative conductance and the signal source load, a substantial reduction in the noise contributed by the load is realized.

In a specific illustrative embodiment of the invention the load comprises the input conductance of an amplifier. In such an arrangement a further advantage is realized since, in addition to reducing the noise contributed by the input conductance of the amplifier, the negative conductance provides a net power gain. This gain reduces the relative effect of subsequent noise sources associated with the receiver which are not short circuited by the inclusion of the negative conductance between the signal source and the amplifier.

If a parametric amplifier is used to develop the negative conductance, the arrangement described above is advantageously used when the ratio of idler frequency to signal frequency is large. When this ratio is not large, the noise contribution of the idler frequency wave energy should also be considered. This gives rise to a second embodiment of the invention which utilizes an isolator between the parametric amplifier and the load. Circuit conditions for optimum noise performance are derived when the isolator temperature and the equivalent signal source temperature are equal and when the isolator temperature is substantially less than the source temperature.

These and other objects and advantages, the nature of the present invention, and its various features, will appear more fully upon consideration of the various illustrative embodiments now to be described in detail in connection with the accompanying drawings, in which.

Figure 1:
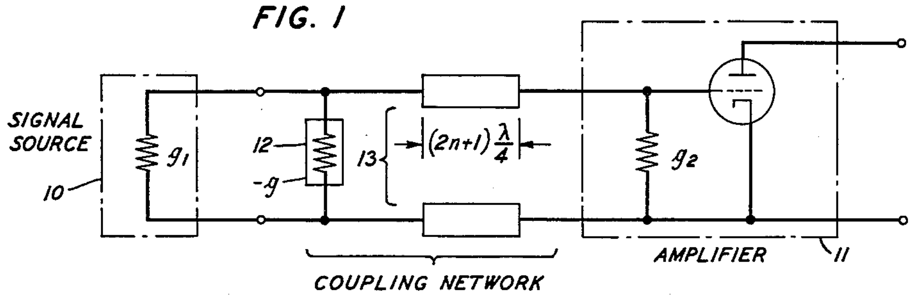
FIG. 1 shows schematically a low noise amplifier in accordance with the invention.

Referring to FIG. 1, there is shown schematically an arrangement for improving the signal-to-noise ratio of a conventional vacuum tube amplifier in accordance with the principles of the invention. The embodiment illustrated comprises a signal source 10 of frequency $f_s$ having an output conductance $g_1$ and a conventional vacuum tube amplifier 11. Associated with amplifier 11 is a grid-to-cathode equivalent conductance $g_2$.

Amplifier 11 is coupled to signal source 10 by means of a coupling network comprising a section of transmission line 13 whose length is an odd multiple of a quarter wavelength at the signal frequency and a negative conductance 12 connected in shunt with the signal source 10 between the signal source 10 and the transmission line 13.

The negative conductance 12 can take the form of a negative resistance parametric amplifier having a suitably connected and pumped voltage sensitive capacitance, such as a varactor diode, or conductance 12 can be a suitably biased diode of the type first described by Leo Esaki in an article entitled "New Phenomenon in Narrow Germanium P-N Junctions," published in the January 15, 1958, Physical Review, No. 109, pages 603 to 604. (Also see "Tunnel Diodes" in the May 1960 Electrical Design News, page 50.) More generally, conductance 12 can be any low noise negative conductance obtained either from a nonlinear reactance effect (parametric amplifier) or from a device having a current versus voltage characteristic which includes a negative resistance region.

Figure 2:
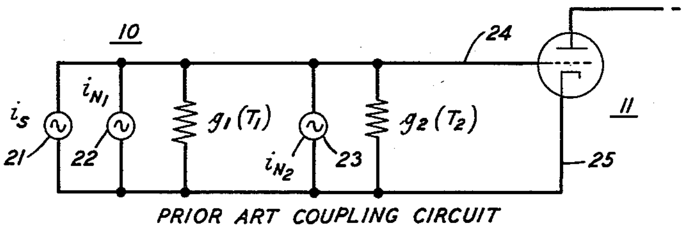
FIG. 2 shows schematically a prior art amplifier including signal and equivalent noise current sources.

In a typical prior art receiver, the signal source, which can be either an antenna or a length of transmission line, is connected directly to the input of the first amplifier. This is illustrated in FIG. 2 in which the signal source 10, having an output conductance $g_1$ at an equivalent noise temperature $T_1$, is connected directly to the input conductance $g_2$ of amplifier 11. Conductance $g_2$ is indicated to be at a temperature $T_2$. In parallel with conductance $g_1$ is a signal current generator 21 and an equivalent noise current generator 22. In parallel with conductance $g_2$ is the equivalent noise current generator 23.

The voltages developed between the grid 24 and the cathode 25 of amplifier 11 due to the signal generator 21 and noise generator 22 are, respectively, $$V_s=\frac{i_s}{g_1+g_2} \quad (1)$$

$$v_{n1}=\frac{i_{n1}}{g_1+g_2} \quad (2)$$

The voltage developed between grid 24 and cathode 25 due to noise generator 23 is $$v_{n2}=\frac{i_{n2}}{g_1+g_2} \quad (3)$$

Noting that the total noise voltage $$v_{nt}^2=v_{n1}^2+v_{n2}^2 \quad (4)$$

and that the noise current per unit bandwidth is given by $$i_n^2=4kTg_n \quad (5)$$

the ratio of signal voltage to total noise voltage at the input to amplifier 11 is given by $$\frac{V_s}{V_{nt}}=\frac{i_s}{\sqrt{4k(T_1g_1+T_2g_2)}} \quad (6)$$

Figure 3:
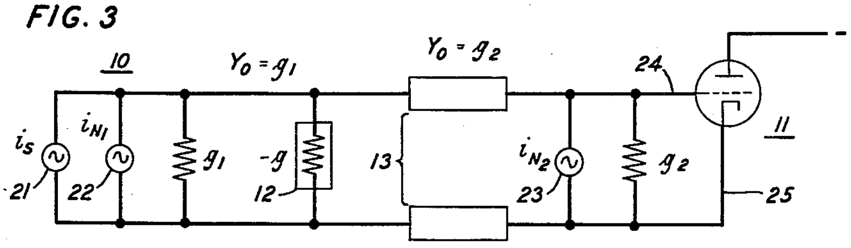
FIG. 3 shows the low noise amplifier, in accordance with FIG. 1, modified to include equivalent signal and noise current sources.

If now, in accordance with the invention, the negative conductance 12 and the length of transmission line 13 are interposed between the signal source 10 and amplifier 11, as indicated in FIG. 3, a similar calculation for the signal-to-noise voltage ratio between grid 24 and cathode 25 can be made.

Considering transmission line 13 to be a substantially lossless section of line and to have a characteristic admittance which is equal to $g_2$, then the signal voltage and the noise voltage developed between the grid and cathode of amplifier 11 due to signal generator 21 and noise generator 22 are, respectively, $$v_s=\frac{i_s}{g_1+g_2-g} \quad (7)$$

and $$v_{n1}=\frac{i_{n1}}{g_1+g_2-g} \quad (8)$$

The voltage developed between the grid and cathode of amplifier 11 due to noise generator 23 is $$v_{n2}=\frac{i_{n2}}{g_2+g_e} \quad (9)$$

where $g_e$ is the effective conductance in parallel with $g_2$ due to conductances $g_1$, $-g$, and transmission line 13.

Using Equations 4 and 5, the ratio of signal voltage to total noise voltage at the input to amplifier 11 is then $$\frac{v_s}{v_n}=\frac{\dfrac{i_s}{g_1+g_2-g}}{\sqrt{\dfrac{4kT_1g_1}{(g_1+g_2-g)^2}+\dfrac{4kT_2g_2}{(g_2+g_e)^2}}} \quad (10)$$

To maximize the signal voltage to noise voltage ratio the term $$\frac{4kT_2g_2}{(g_2+g_e)^2}$$

is minimized. In particular, the value of conductance 12 and the length of line 13 are selected so that there is an effective short circuit in parallel with $g_2$ (i.e., $g_e=\infty$).

Expressing $g_e$ in terms of the circuit parameters gives $$g_e=g_2\frac{(g_1-g)\cos\beta l+jg_2\sin\beta l}{g_2\cos\beta l+j(g_1-g)\sin\beta l} \quad (11)$$

where $\beta l$ is the electrical length of line 13. By making $|g|=|g_1|$, Equation 11 reduces to $$g_e=jg_2\tan\beta l \quad (12)$$

By further selecting $$\beta l=(2n+1)\frac{\lambda}{4}$$

where $n$ is an integer, the equivalent open circuit at the source side of line 13 (obtained by making $|g|=|g_1|$) is transformed to a short circuit across the input circuit of amplifier 11. With these adjustments in the circuit parameters, the signal-to-noise voltage ratio at the input to amplifier 11 is maximized and Equation 10 reduces to $$\frac{v_s}{v_n}=\frac{i_s}{\sqrt{4kT_1g_1}} \quad (13)$$

It will be noted by comparing Equations 13 and 4 that the noise contribution of $g_2$ in the embodiment of FIG. 3 is reduced to zero and that the signal-to-noise voltage ratio at the input to amplifier 11 is the same as that at the signal source. Thus, the coupling network comprising the negative conductance 12 and the transmission line 13 has, in effect, "cooled" the input conductance $g_2$ of amplifier 11. In addition, it can be shown that there is a net power gain obtained from the negative conductance for power leaving the signal source. For the particular case of $|g_1|=|g|$, a power gain of $$\frac{4g_1}{g_2}$$

is realized for power delivered to conductance $g_2$. Thus, the coupling network, in addition to minimizing the noise contribution of conductance $g_2$, functions as an amplifier thereby simultaneously reducing the relative effect of noise sources in amplifier 11 which are not "cooled" by the coupling network.

In the above discussion it is assumed that the noise contribution of the negative conductance 12 is nil. This, of course, is inaccurate. Every known device capable of developing a negative conductance produces some noise energy which contributes to the total noise of a receiver. The noise contribution of the negative conductance 12 can be taken into effect by adding an equivalent noise source in parallel with the negative conductance 12. This has the effect of adding another term to the denominator of Equation 13. If this added term is less than the noise contribution would have been from conductance $g_2$, as given by Equation 9, then the addition of the negative conductance 12 in accordance with the teachings of the invention results in a net improvement in the over-all noise performance of the reeciver. If, on the other hand, the noise contribution due to the addition of the negative conductance 12 is greater than the noise contribution would have been from conductance $g_2$, there is an over-all net impairment in the over-all noise performance of the receiver.

As indicated above, the negative conductance 12 can be produced by either an Esaki diode or by a negative resistance parametric amplifier. If a parametric amplifier is used to develop the negative conductance 12, the analysis given above is accurate provided that the ratio of idler frequency $f_i$ to signal frequency $f_s$ is large, i.e., of the order of ten or more. This restriction arises since a parametric amplifier has an associated pumping frequency which, due to the presence of a nonlinear element, can mix with noise power at frequencies other than the signal frequency to produce modulation products at the signal frequency. As the ratio of idler-to-signal frequency decreases, the noise generated due to the presence of the idler frequency increases thereby reducing the measure of improvement.

Figure 4:
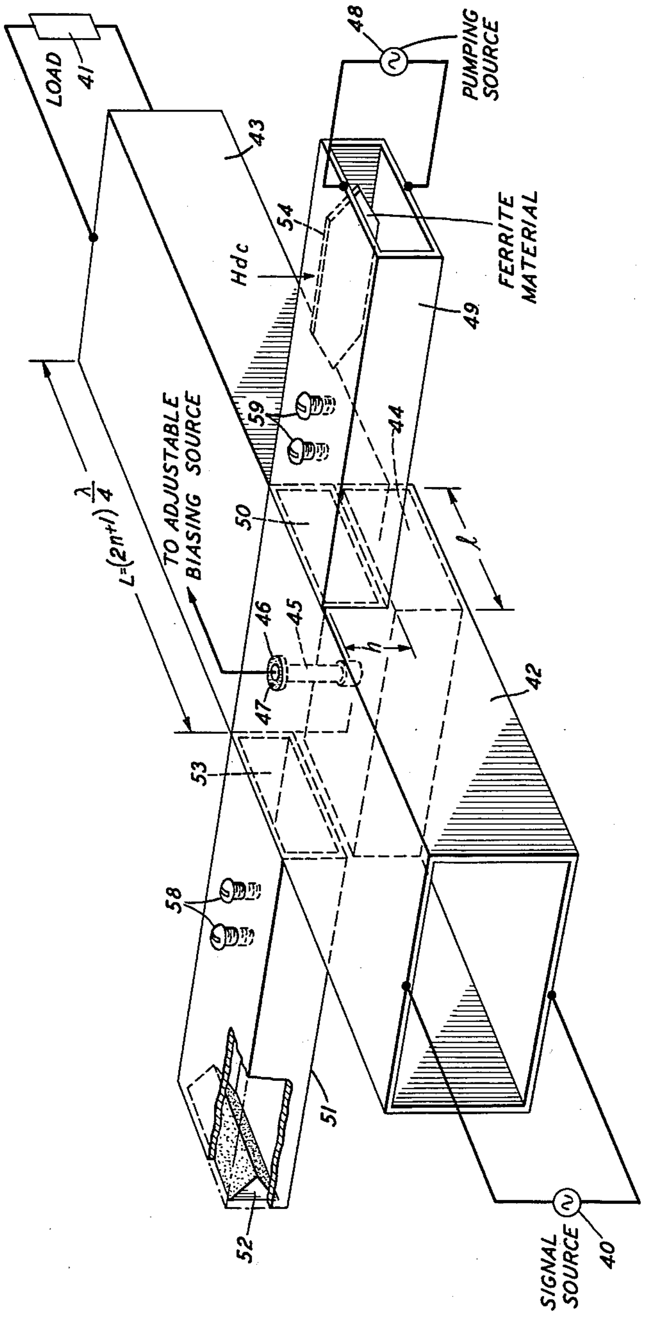
FIG. 4 shows, in perspective, an embodiment of the invention in accordance with FIG. 1.

FIG. 4 is an illustrative embodiment of the invention in which a signal source 40 and a load 41 are connected to a negative conductance by means of sections of rectangular waveguide 42 and 43. The latter guide, in accordance with the teachings of the invention, has an electrical length L equal to an odd multiple of a quarter wavelength at the signal frequency. In the general case, the conductance of the signal source and the load are different. Since these are used to match-terminate the respective guides 42 and 43, the guides have different characteristic admittances. Accordingly, guides 42 and 43 are shown having different narrow cross-sectional dimensions.

In the illustrative embodiment of FIG. 4, the negative conductance is generated by means of parametric action which, for purposes of illustration, is obtained through the utilization of a so-called "dam" cavity parametric amplifier described in my copending application Serial No. 75,232, filed December 12, 1960. The amplifier comprises a section of reduced height waveguide formed by a conductive obstruction, or dam 44 located in guide 42 at the junction of guides 42 and 43. The dam 44, of length $l$, extends from the lower wide wall of guide 42 to within a distance $h$ of the upper wide wall of guide 42. A varactor diode 45 is conductively connected at one end to the upper surface of dam 44. The other end of diode 45 extends through an aperture 46 in the upper wide wall of guide 42 and is, in turn, connected to an adjustable biasing source. An insulating sleeve 47 securely holds diode 45 in position.

Pumping energy, derived from a pumping source 48, is applied to varactor 45 by means of a transversely extending rectangular waveguide 49 which abuts upon guide 42 in the region of dam 44. Coupling between guide 49 and guide 42 is through an aperture 50 cut in the narrow wall of guide 42 directly above the dam 44.

A second transversely extending waveguide 51, terminated in a dissipative wedge 52, abuts upon the other narrow wall of guide 42 directly opposite guide 42. A second aperture 53 couples guide 51 to guide 42.

Located between pumping source 48 and guide 42 is an isolator which freely propagates pumping wave energy from source 48 to guide 42 but which attenuates wave energy propagating in the reverse direction. The isolator can be any of the types well known in the art, such as the ferrite resonance isolator described by A. G. Fox, S. E. Miller and M. T. Weiss in their article entitled "Behavior and Applications of Ferrites in the Microwave Region," published in the January 1955 issue of the Bell System Technical Journal. This type of isolator comprises a slab 54 of ferrite material which is asymmetrically located between the center and one of the narrow walls of guide 49. A biasing field $H_{dc}$ having an intensity sufficient to induce gyromagnetic resonance in slab 54 at the idler frequency is applied to the slab in a direction normal to the wide walls of guide 49. The biasing field can be supplied by an electric solenoid (not shown), by a permanent magnet or the ferrite material can be permanently magnetized if desired.

In operation signal frequency wave energy from source 40 is applied to the varactor diode 45 along with pumping wave energy from the pumping source 48. The height $h$ and the length $l$ of dam 44 are proportioned to appropriately resonate diode 45 at the signal frequency. The gain-bandwith characteristic of the amplifier can be optimized by means of tuning screws (not shown) in guides 42 and 43 and by adjusting the diode bias as explained in my copending application.

Since the ratio of idler frequency to signal frequency is advantageously made large (in the order of ten or more) the idler frequency will fall outside the pass band of the signal cavity. In fact, the idler frequency is much closer to the pump frequency than the signal frequency. The idler wave, therefore, establishes itself along the dam in the mode of the pumping wave which is in the nature of a strip transmission line mide. To facilitate this, sets of tuning screws 58 and 59 are provided. The dissipative wedge 52 and the ferrite slab 54 provide the terminating impedances for the idler wave.

To minimize the noise contribution of the load conductance, the source conductance and the negative conductance generated by the varactor diode are adjusted to be equal in accordance with the teachings of the invention.

While no refrigeration is shown, it is understood that the entire structure or parts thereof can be refrigerated if desired.

When an Esaki diode or other type of device having an inherent negative conductance is used to produce the negative conductance, the circuit is considerably simplified in that no pumping circuit is required. Accordingly, pumping source 48 and guides 49 and 51 can be eliminated from the illustrative embodiment of FIG. 4.

The analysis given above is directly applicable to an Esaki diode amplifier or to a parametric amplifier in which the ratio of idler frequency to signal frequency is preferably large. If this ratio is not large (of the order of ten or less), the noise contribution of the idler frequency should be considered. This is so since there is associated with a parametric amplifier a pumping frequency which, due to the presence of the nonlinear reactive element, can mix with noise components at frequencies other than the signal frequency to produce modulation products that lie at the signal frequency. Because of this some modification of the circuit of FIG. 1 is desirable.

Figure 5:
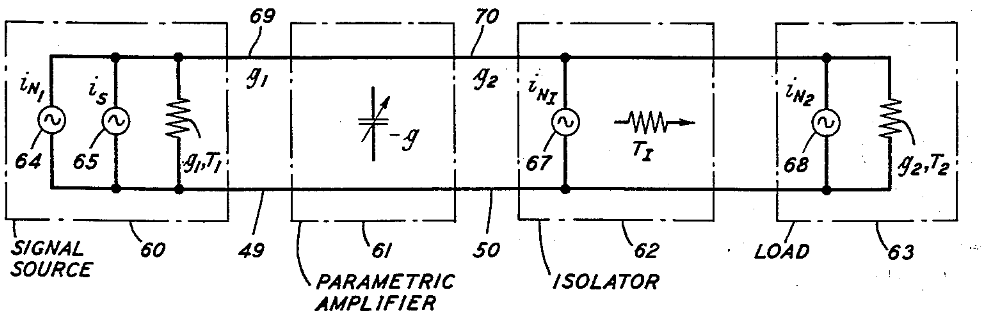
FIG. 5 shows schematically a low noise parametric amplifier in accordance with a second embodiment of the invention.

FIG. 5 is illusrative of an arrangement to obtain low noise amplification using a parametric amplifier in which the idler-to-signal frequency ratio $$\frac{f_i}{f_s}$$

is small (less than ten). Shown schematically, the device comprises a signal source 60 having an output admittance $g_1$ at a temperature $T_1$, a parametric amplifier 61 which develops a negative conductance $-g$, an isolator 62 at temperature $T_I$ and a load conductance $g_2$ at a temperature $T_2$. The box representing the parametric amplifier is intended to symbolize the varactor, its pump source, and all the filters and circuit elements necessary to make an operative device. The isolator, assumed to have no forward loss and infinite reverse loss, is inserted between the parametric amplifier 61 and the load conductance 63.

In shunt with the source conductance $g_1$ is an equivalent noise current generator 64 and a signal current generator 65. Similarly, an equivalent noise current generator 67 is in shunt with isolator 62 and an equivalent noise current generator 68 is in shunt with the load conductance $g_2$.

The parametric amplifier 61 is placed at the junction of two transmission lines 69 and 70 of generally different characteristic conductances $g_1$ and $g_2$, respectively. Source conductance $g_1$ match-terminates transmission line 69 to the left of amplifier 61. Load conductance $g_2$ match-terminates transmission line 70 to the right of amplifier 61. Isolator 62 is similarly matched to line 70. To illustrate the effects experienced in this type of device utilizing a parametric amplifier, a three frequency quasi-degenerate type of amplifier is considered in which there are only two bands of frequencies which contribute noise. These bands are assumed to lie very close to one another and to be symmetrically placed about one-half of the pump frequency. They are assumed to have a common source conductance and a common load conductance. Then, assuming the reactive component of the input admittance of the diode to be shunt resonated at both signal and idler frequencies (a lossless varactor with no appreciable series inductance) we are left with a negative conductance under the conditions specified by H. E. Rowe in his paper "Some General Properties of Nonlinear Elements II. Small Signal Theory," published in the May 1958 Proceedings of the Institute of Radio Engineers, Volume 46, pages 850 to 860. One can then use this negative conductance to obtain reflection and transmission gain for both the signal and the idler frequencies.

For the circuit of FIG. 5 there are two power reflection coefficients $$\overrightarrow{P_R} \text{ and } \overleftarrow{P_R}$$

and one power transmission coefficient $P_T$ which are of significance.

$$\overrightarrow{P_R} \text{ and } \overleftarrow{P_R}$$

are the power reflection coefficients for signals approaching amplifier 61 from $g_1$ and $g_2$, respectively. $P_T$ is the power transmission coefficient for waves traversing amplifier 61 in either direction. One can write for these coefficients $$\overrightarrow{P}_R=\left(\frac{g_1-g_2+g}{g_1+g_2-g}\right)^2 \quad (14)$$

$$\overleftarrow{P}_R=\left(\frac{g_2-g_1+g}{g_1+g_2-g}\right)^2 \quad (15)$$

$$P_T=\frac{4g_1g_2}{(g_1+g_2-g)^2} \quad (16)$$

where $-g$ is the equivalent negative conductance developed by amplifier 61.

For the particular condition that $$\frac{f_i}{f_s}\approx 1$$

these expressions are essentially the same for both the signal and the idler. Equations 14 through 16 are, therefor, valid for signal gain and idler gain. With the parametric amplifier, however, we must also consider signal-to-idler gain and idler-to-signal gain. One can make use of the general energy relations given by J. M. Manley and H. E. Rowe in their paper entitled "Some General Properties of Nonlinear Elements. I. General Energy Relationship," published in the Proceedings of the Institute of Radio Engineers, Volume 44, pages 904 to 913, July 1952 to obtain these gains in terms of $$\overrightarrow{P_R}, \overleftarrow{P_R} \text{ and } P_T$$

These relations require that the ratio of the net power leaving the signal port to the net power leaving the idler port be equal to the ratio of the signal frequency to the idler frequency. For the conditions that we have adopted $$(\text{i.e., } f_s \approx f_i)$$

the net power leaving the signal port is approximately equal to the net power leaving the idler port. Accordingly, if a signal (or idler) wave is incident upon the parametric amplifier under the stated conditions and experiences some reflection gain and transmission gain, by requiring that the net power out be the same for the idler (or signal), the following equations are obtained:

$$\overrightarrow{P}_{(SI)R}=\overrightarrow{P}_{(IS)R}=(\overrightarrow{P}_R+P_T-1)\frac{g_1}{g_1+g_2} \quad (17)$$

$$\overleftarrow{P}_{(SI)R}=\overleftarrow{P}_{(IS)R}=(\overleftarrow{P}_R+P_T-1)\frac{g_2}{g_1+g_2} \quad (18)$$

$$\overrightarrow{P}_{(SI)T}=\overrightarrow{P}_{(IS)T}=(P_T+\overrightarrow{P}_R-1)\frac{g_2}{g_1+g_2} \quad (19)$$

$$\overleftarrow{P}_{(SI)T}=\overleftarrow{P}_{(IS)T}=(\overleftarrow{P}_T+P_R-1)\frac{g_1}{g_1+g_2} \quad (20)$$

The fractional multiplier on the right of the above equations is due to the fact that the power splits between $g_1$ and $g_2$.

The noise power per unit signal bandwith approaching $g_2$ can now be written as $$N_2=kT_1P_T+kT_1\overrightarrow{P}_{(IS)T}+kT_1\overleftarrow{P}_R+{}^kT_1\overleftarrow{P}_{(IS)R} \quad (21)$$

where $k$T is the maximum available noise power per unit of bandwidth obtainable from a conductance $g$. Upon substitution for the power coefficients, as given by Equation 14 to 20, Equation 21 becomes $$N_2=kT_1\frac{4g_1g_2}{(g_1+g_2)}\frac{(g_1+g_2+g)}{(g_1+g_2-g)^2}+kT_I\left[\frac{(g_2-g_1+g)^2}{(g_1+g_2-g)^2}+\frac{4gg_2^2}{(g_1+g_2)(g_1+g_2-g)^2}\right] \quad (22)$$

The operating noise FIGURE F (single channel) for transmission operation, defined as the ratio of the maximum available signal-to-noise power at the input to the maximum available signal-to-noise power at the output, can then be written as $$F=1+\frac{g}{g_1+g_2}+\frac{T_I}{T_1}\left[\frac{(g_2-g_1+g)^2}{4g_1g_2}+\frac{gg_2}{g_1(g_1+g_2)}\right] \quad (23)$$

It has been shown by H. A. Haus and R. B. Adler in their book "Circuit Theory of Linear Noisy Networks," published by John Wiley & Sons, Inc., that noise measure is a more convenient and perhaps more meaningful way of characterizing the noise performance of amplifiers than the more conventional noise figure. The noise measure of an amplifier is defined as $$M=\frac{F-1}{1-\frac{1}{G}} \quad (24)$$

where G is the amplifier gain. This leads to a single channel noise measure M given by $$M=\frac{g}{g_1+g_2}\cdot\frac{4g_1g_2}{4g_1g_2-(g_1+g_2-g)^2}+\frac{T_I}{T_1}\left[\frac{(g_2-g_1+g)^2}{4g_1g_2-(g_1+g_2-g)^2}+\frac{4gg_2^2}{(g_1+g_2)(4g_1g_2-[g_1+g_2-g]^2)}\right] \quad (25)$$

As can be seen, the noise measure is a function of both $g_1$ and $g_2$ and, thus, can be optimized by an appropriate choice of the ratio of these conductances. It must be remembered, however, that $g$ is also a function of $g_1$ and $g_2$ and is given by $$g=\frac{(2\pi f_s)(2\pi f_i)C_1^2}{g_1+g_2} \text{ or } g=\frac{K}{g_1+g_2} \quad (26)$$

where K is a constant, independent of $g_1$ and $g_2$ and $C_1$ is as defined by Rowe. Thus, we make the above substitution into Equation 25 to obtain, $$M=\frac{4Kg_1g_2}{[4g_1g_2(g_1+g_2)^2-([g_1+g_2]^2-K)^2]}+\frac{T_I}{T_1}\left[\frac{(g_2^2-g_1^2+K)^2+4Kg_2^2}{(g_1+g_2)^24g_1g_2-[(g_1+g_2)^2-K]^2}\right] \quad (27)$$

For a noiseless amplifier, the noise measure is zero. Accordingly, we seek a relationship among the parameters $g_1$, $g_2$, $T_I$ and $T_1$, which minimizes the noise measure as given by Equation 27. The most general expression which minimizes the noise measure, however, is too involved to be of practical use. There are, nevertheless, two particular conditions which are of practical importance. In the first instance, the isolator and the source are at the same temperatre, i.e., $T_I=T_1$. In this case, the noise measure reduces to its minimum value of unity regardless of the gain of the amplifier when $$g_2=g_1-g \quad (28)$$

The noise measure can be reduced below unity by cooling the isolator. Thus, in an embodiment which utilizes refrigeration to cool the parametric amplifier, the noise measure can be improved by also cooling the isolator. If, in particular, the isolator temperature is sufficiently less than the source temperature ($T_I<<T_1$) so that the second term in Equation 27 becomes negligible, noise measure $$M=\frac{g_1}{g_1+g_2} \quad (29)$$

is realized.

The noise measure for $T_I<<T_1$, however, is a function of the amplifier gain. If we substitute equation 28 in Equation 16, we find that the amplifier gain G is equal to $$\frac{g_1}{g_2}$$

and Equation 29 reduces to $$M=\frac{G}{1+G} \quad (30)$$

For large gains the noise measure approaches unity. As the gain decreases the noise measure improves, approaching zero as the gain approaches zero. Accordingly, in the design of an amplifier in accordance with the invention, a comprise between gain and noise measure must be effected depending upon the particular application.

It is important to note that due to the presence of the idler, the noise contribution of the isolator cannot be "cooled" in a manner similar to the "cooling" of the load conduction in the embodiment of FIG. 1.

Figure 6:
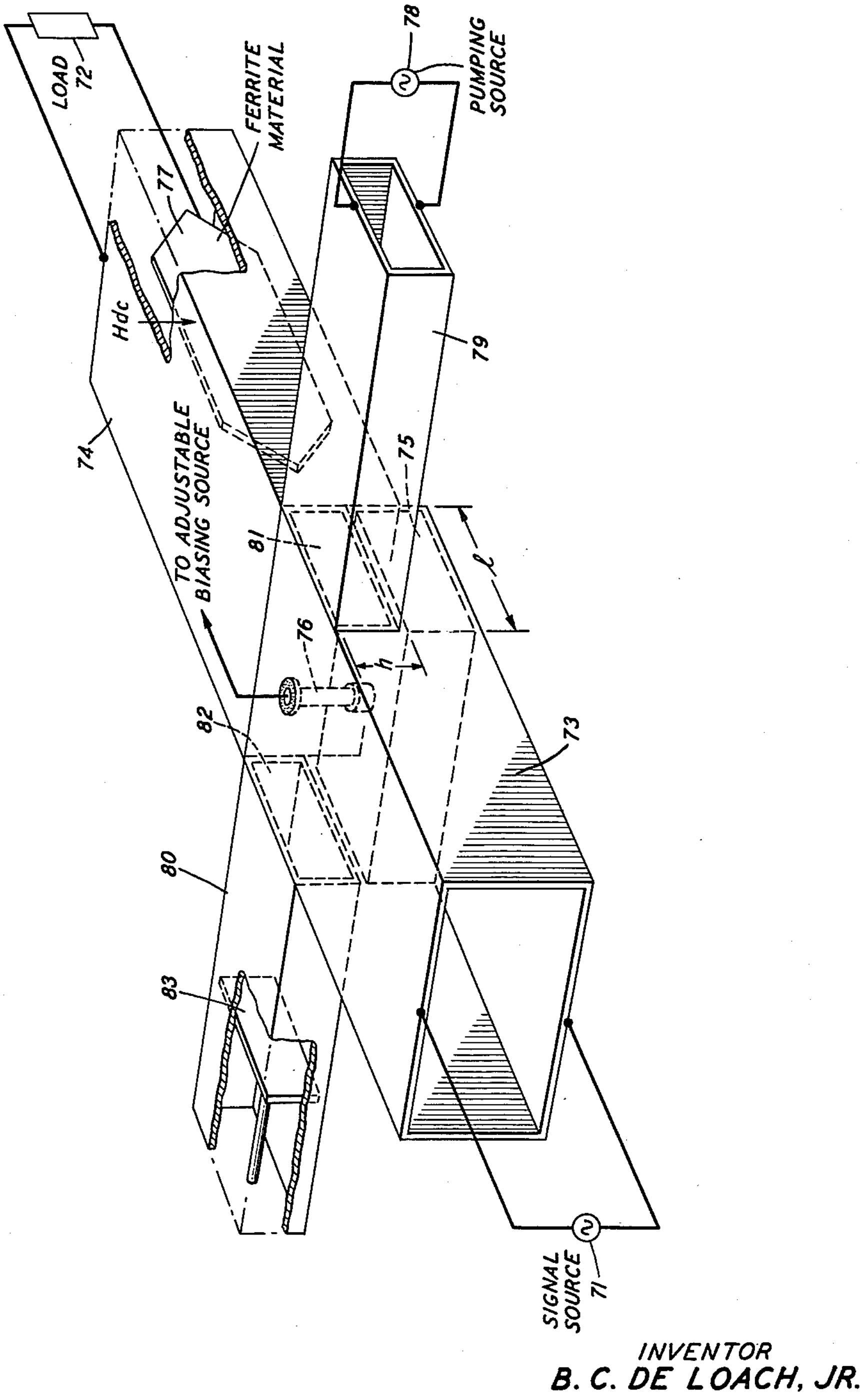
FIG. 6 shows, in perspective, the embodiment of the invention in accordance with FIG. 5.

FIG. 6 is an illustrative embodiment of the arrangement shown schematicaly in FIG. 5. The embodiment is similar to that shown in FIG. 4 and includes a signal source 71 and a load 72 connected to a negative conductance parametric amplifier by means of rectangular waveguides 73 and 74. The source 71 and load 72 match-terminate guides 73 and 74, respectively. The parametric amplifier comprises a section of reduced height waveguide formed by the dam 75 and the varactor 76 connected as explained in connection with FIG. 4.

Located in guide 74 is an isolator comprising an asymmetrically located slab of ferrite 77, magnetically biased to gyromagnetic resonance at the signal frequency by a biasing field $H_{dc}$. The location of slab 77 and the direction of the biasing are such as to freely propagate signal wave energy from the parametric amplifier to load 72 but to attenuate signal wave energy propagating in the reverse direction.

Pumping power at a frequency $f_p$ derived from pumping source 78 is coupled to varactor 76 through apertures 81 and 82 in the narrow walls of guide 73 directly above the dam 75 by means of waveguides 79 and 80 which abut upon guide 73. Guide 80 is terminated in a slidable shorting plunger 83 which is adjusted to optimize the pumping circuit.

Depending upon the temperature $T_1$ of the signal source, the isolator temperature $T_I$ is either raised or lowered so that $T_I=T_1$, or $T_I<<T_1$, and the circuit conductances are adjusted as indicated by Equation 28.

In addition to adjusting the temperature of the isolator, the temperature of the parametric amplifier is advantageously lowered by providing refrigerating means, not shown.

In all cases it is understood that the above-described arrangements are merely illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination, a source of wave energy at a frequency $f_s$ having an output conductance $g_1$, a load having an input conductance $g_2$, and means for improving the signal-to-noise ratio at said load including means for connecting said source to said load comprising a section of transmission line whose electrical length is an odd multiple of quarter wavelengths at said frequency $f_s$, and a low noise negative conductance $g$ equal to $-g_1$ connected in shunt with said source between said source and said line.

2. The combination according to claim 1 wherein said negative conductance is derived from an Esaki diode.

3. The combination according to claim 1 wherein said negative conductance is derived from a parametric amplifier.

4. The combination according to claim 3 wherein said amplifier has an idler frequency $f_i$ associated therewith and wherein the ratio $$\frac{f_i}{f_s}$$

is large.

5. In combination, a source of signal wave energy at frequency $f_s$ having an output conductance $g_1$ and an equivalent temperature $T_1$, means for amplifying said signal comprising a low noise parametric amplifier having an equivalent conductance $-g$ at said signal frequency coupled to said source, a load having an input conductance $g_2=g_1-g$, means for coupling said amplifier to said load comprising an isolator having a temperature $T_I=T_1$, said isolator offering substantially little attenuation to signal energy propagating from said amplifier to said load but offering a large attenuation to signal wave energy propagating from said load to said amplifier.

6. A low noise amplifying system comprising, in combination, a low noise negative conductance amplifier having an output conductance $-g$, first and second transmission lines electromagnetically coupled to said amplifier, said first line being match-terminated by means of a source of wave energy of wavelength $\lambda$, said source having an output conductance $+g$, said second line having a length $$(2n+1)\frac{\lambda}{4}$$

where $n$ is any integer, and a load conductance for match-terminating said second line.

7. The combination according to claim 6 wherein said amplifier comprises a diode whose current-voltage characteristic includes a negative conductance region.

8. The combination according to claim 6 wherein said amplifier comprises a parametric amplifier.

9. In combination, a source of signal wave energy at frequency $f_s$, said source having an output conductance $g_1$, and an equivalent temperature $T_1$, means for amplifying said signal comprising a low noise parametric amplifier having an equivalent conductance $-g$ at said frequency coupled to said source, a load having an input conductance $g_2=g_1-g$, means for coupling said amplifier to said load comprising an isolator having a temperature $T_I$ much less than $T_1$, said isolator offering substantially little attenuation to signal energy propagating from said amplifier to said load but offering a large attenuation to signal wave energy propagating from said load to said amplifier.

10. A low noise parametric amplifier comprising first, second and third sections of rectangular waveguide each having a pair of narrow and a pair of wide walls, said second waveguide having a narrow internal dimension substantially smaller than that of said first and third waveguides, said waveguides arranged in longitudinal succession with their respective wide and narrow walls parallel to each other and with said second waveguide disposed between said first and third waveguides, a variable capacitance diode extending transversely across said second waveguide in a direction parallel to the narrow dimension thereof, said second waveguide forming a cavity whose dimensions are proportioned to resonate said diode at a signal frequency, means for inducing a negative conductance $-g$ at said signal frequency comprising means for coupling pumping wave energy into said diode at a frequency higher than said signal frequency, means for applying wave energy at said signal frequency to said first waveguide comprising a signal source having an output conductance $g_1$ and an equivalent temperature $T_1$, a load having an input conductance $g_1-g$ connected to said third waveguide, and an isolator having a temperature $T_I$ equal to $T_1$ disposed between said load and said second waveguide, said isolator offering substantially little attenuation to signal energy propagating from said second waveguide to said load but offering a large attenuation to signal energy propagating from said load to said second waveguide.

11. A low noise amplifier comprising first, second and third sections of rectangular waveguide each having a pair of narrow and a pair of wide walls, said second waveguide having a narrow internal dimension substantially smaller than that of said first and third waveguides, said waveguide arranged in longitudinal succession with their respective wide and narrow walls parallel to each other and with said second waveguide disposed between said first and third waveguides, a low noise active element having a current versus voltage characteristic including a negative conductance portion extending transversely across said second waveguide, said second waveguide forming a cavity whose dimensions are proportioned to resonate said element at a signal frequency, means for biasing said element in the region of said negative conductance portion, said element and said cavity producing an equivalent negative conductance $-g$ at said signal frequency, means for applying wave energy at said signal frequency to said first waveguide comprising a signal source having an output conductance $+g$, and a load connected to said third waveguide at a distance $$(2n+1)\frac{\lambda}{4}$$

from said second waveguide, where $\lambda$ is the guide wavelength in said third waveguide at said signal frequency.

12. A low noise parametric amplifier proportioned to support wave energy at a pumping frequency $f_p$, a signal frequency $f_s$ and an idler frequency $f_i=f_p-f_s$, where the ratio $$\frac{f_i}{f_s}$$

is large, comprising first, second and third sections of rectangular waveguide each having a pair of narrow and a pair of wide walls, said second waveguide having a narrow internal dimension substantially smaller than that of said first and third waveguides, said waveguides arranged in longitudinal succession with their respective wide and narrow walls parallel to each other and with said second waveguide disposed between said first and third waveguides, a variable capacitance diode extending transversely across said second waveguide in a direction parallel to the narrow dimension thereof, said second waveguide forming a cavity whose dimensions are proportioned to resonate said diode at said signal frequency, means for inducing a negative conductance $-g$ at said signal frequency comprising fourth and fifth sections of waveguide having one of their transverse ends abutting upon opposite narrow walls respectively of said second waveguides, means for electromagnetically coupling said fourth and fifth waveguides to said second waveguide, means for applying pumping wave energy to the other end of said fourth waveguide, means for terminating the said fourth and fifth waveguides in a dissipative load for said idler frequency, means for applying wave energy at said signal frequency to said first waveguide comprising a signal source having an output conductance $+g$, and a load connected to said third waveguide at a distance $$(2n+1)\frac{\lambda}{4}$$

from said second waveguide where $\lambda$ is the guide wavelength in said third waveguide for wave energy at said signal frequency.

References Cited in the file of this patent

UNITED STATES PATENTS 2,775,658 Mason et al. ............ Dec. 25, 1956

OTHER REFERENCES

Hines: "Bell System Technical Journal" May 1960, pages 477–513.